Aug. 30, 1938.  D. M. SOLENBERGER  2,128,717
PISTON EXPANDER
Filed Oct. 19, 1936
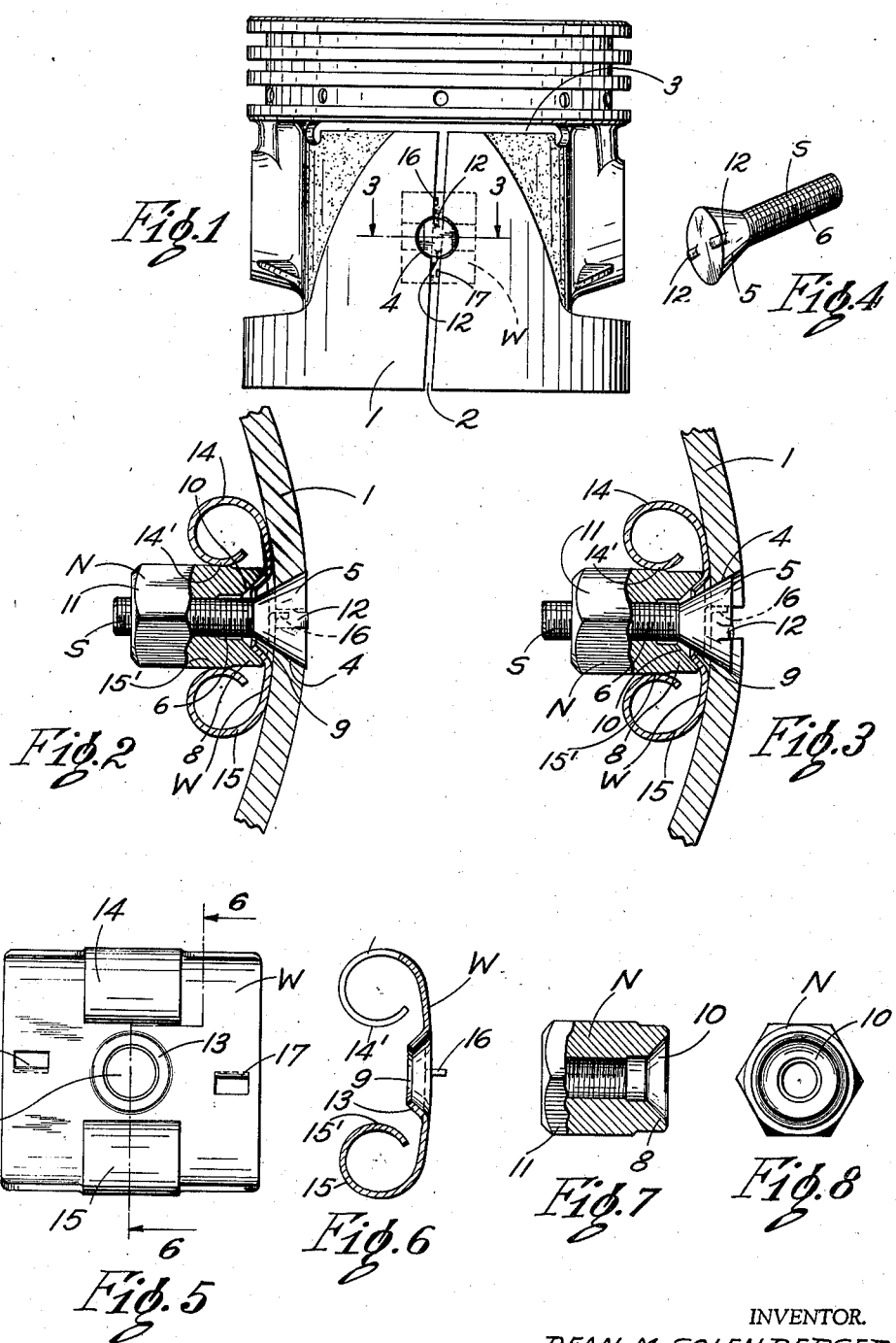
INVENTOR.
DEAN M. SOLENBERGER
BY Richey & Watts
ATTORNEYS Patented Aug. 30, 1938

2,128,717

UNITED STATES PATENT OFFICE 2,128,717

PISTON EXPANDER

Dean M. Solenberger, Cleveland, Ohio, assignor to Simplex Products Corporation, a corporation of Ohio Application October 19, 1936, Serial No. 106,283

16 Claims. (Cl. 309—12)

This invention relates to piston re-sizing or expanding devices and more particularly to an improved type of piston expander for use with split or slotted skirt pistons.

It is among the objects of my invention to provide a universally adaptable piston expander which may be readily inserted in substantially all types and sizes of pistons with a minimum of machining or other preparatory work. Other objects of my invention are: the provision of a piston expander of light weight, which is securely positioned and locked in the piston so that it will not drop out in use; the provision of a piston skirt expander which is adjustable to expand the usual automobile type piston from as little as .001" to .002" in diameter to as much as .020"; the provision of a piston expander which is susceptible to simple and economical manufacture and which may be easily installed in a piston and adjusted to give the desired degree of expansion; and the provision of a piston expander which may effectively be used in pistons having a wide range of skirt wall thicknesses.

The above and other objects of my invention will appear from the following description of one embodiment thereof, reference being had to the accompanying drawing, in which—

Figure 1 is a side elevation of a split skirt piston of common form, showing my expander in position.

Figure 2 is an enlarged cross-sectional plan view of the expander installed in the piston of Figure 1, showing the expander in position to start its expanding action.

Figure 3 is an enlarged cross-sectional view, generally similar to Figure 2, and taken on line 3—3 of Figure 1, illustrating the expander and piston in expanded position.

Figure 4 is a detached perspective view of the adjusting screw illustrating the tapered head and aligning lugs.

Figure 5 is an enlarged view, partly in section, of the washer and adjusting nut lock.

Figure 6 is a sectional view taken on line 6—6 of Figure 5.

Figure 7 is a side elevation, partly in section, of the adjusting nut.

Figure 8 is an end view of the adjusting nut showing the tapered recess.

My expander is intended for use with pistons having their skirts slotted in a generally axial direction. In the case of pistons that are not normally slotted, a slot may be cut in the skirt by any suitable means so that my expander can be inserted and the piston re-sized as desired.

Referring to Figure 1, the piston illustrated is of the T-slot type having a skirt portion 1 which is slotted at 2. A transverse slot 3 may also be provided. In order to prepare a worn or undersized piston to receive my expanding device the skirt is counter-bored at 4 (Figs. 2 and 3) by a suitable counter-boring tool (not shown). This operation may conveniently be carried out by a simple counter-boring tool used in a hand drill. As is seen in Figure 1, this counter-bore is preferably disposed near the center of the slot 2. It will further be noted that the counter-bore is circular in cross-section and is tapered to engage the taper on the head 5 of the adjusting screw S. As will later appear, the position of the counter-bore and expanding device along the slot 2 may be varied to meet various conditions.

As is seen in Figures 2 and 3, the screw S is inserted in the piston skirt 1 with its tapered head 5 disposed in the counter-bore 4 in the piston skirt. This counter-bore 4 is preferably disposed so that it lies half on one side of the slot 2 and half on the other side. An adjusting nut N has threaded engagement with the threaded shank portion 6 of the screw S and a locking washer W, preferably of spring steel, is disposed between the end 8 of the nut N and the piston skirt 1. As is seen in Figures 2 and 3, the hole 9 in the washer W is made somewhat larger than the threaded shank portion 6 of the screw so that the tapered portion 5 of the screw head may pass partially through the washer.

The end 8 of the nut N is counter-bored, as seen at 10, and the portion 11 of the nut is hexagonal shape to accommodate a wrench for installing and adjusting the expander. It will be understood, of course, that other means of turning the nut may be provided without departing from the spirit of my invention. Oppositely disposed lugs 12 are formed on the outer face of the tapered head 5 of the screw S. In the embodiment of my invention illustrated herein the lugs 12 are formed by displacing portions of the metal of the head 5 to form projections which extend out beyond the tapered surface of the head. However, the lugs may be formed in any desired manner and in some cases a single lug may be sufficient. As is clearly seen in Figure 1, these flanges or lugs 12 engage the sides of the slot 2 and prevent the screw S from rotating relative to the piston skirt.

In installing one of my expanding devices in a piston, the skirt having first been counter-bored at the slot, as above explained, the screw S is inserted into the counter-bored portion of the slot so that its tapered head 5 seats in the counterbore. The spring nut locking washer W is then slipped over the threaded end 6 of the screw and the nut N screwed down until it assumes the position shown in Figure 2. At this point the counterbored end 8 of the nut N has just begun to exert pressure upon the correspondingly flared portion 13 of the washer W and consequently the tapered head 5 of the screw S will start to exert an expanding pressure on the opposite sides of the piston skirt. As the nut N is screwed down tighter the washer W engages the inner wall of the piston skirt and a greater expanding force is exerted through the tapered surface of the head 5 and the counter-bore 4 in the piston skirt wall.

By varying the degree of rotation imparted to the nut N the degree of expansion given the piston skirt may be controlled. As is clearly seen in Figures 2, 3, 5 and 6 of the drawing, the spring locking washer W has a pair of curved spring locking portions 14 and 15. These are formed integrally with the body of the washer W and are preferably somewhat wider than the flat faces of the hexagonal portion 11 of the nut N. The inner faces 14' and 15' of the spring portions 14 and 15 are made so that in the absence of the nut N they are closer together than the distance across the flats of the hexagonal portions of the nut. Thus, when the device is assembled and in position in a piston, the portions 14' and 15' exert a spring pressure against opposite flat faces of the nut N (see Figs. 2 and 3). This spring pressure serves as an effective lock, preventing loosening of the nut in operation and also making possible an accurate measure of the amount of rotation given the nut during adjustment of the expander. The pressure of the spring members 14 and 15 can be felt through the wrench by which the nut is turned and thus the number of notches or one-sixth turns imparted to the nut may be readily counted. The double opposed arrangement of the supporting and locking springs 14 and 15 provides a balanced construction whereby canting or tilting of the adjusting screw S relative to the piston skirt is prevented and thus wear between the piston skirt and the parts of the expander is in large measure eliminated. The washer W is also provided with a punched out portion or flared flange 13 which engages and coacts with the counter-bore 10 in the end 8 of the nut N. The flared surface 13 and the counter-bore 10 co-act to center the washer W relative to the screw S and the nut N and also positively prevent the inner edges of the hole in the washer W from rubbing against the screw S causing harmful wear which might eventually result in completely shearing off of the screw and failure of the expander. This centering action of the coacting tapered faces 13 and 10 is clearly seen in Figures 2 and 3 and as their bevel or angle is preferably about 90° the possibility of jamming or sticking of the parts is eliminated.

The washer W is also provided with punched out lugs 16 and 17 which extend out from the body of the washer in the opposite direction from the flared surface 13 and which are adapted to extend into the slot 2 in the piston skirt. These lugs serve to prevent rotation of the washer W relative to the piston skirt. Their positions when the device is installed in a piston are clearly seen in Figure 1.

When my expander is installed in a piston and the nut N tightened to give the desired degree of expansion and securely locked in position by the spring members 14 and 15, the entire expander assembly is rigid and subjected to a minimum of movement between its parts. Thus, the problem of wear is overcome and the device will remain in position and carry out its intended function for long periods of time.

It will be seen that my expander may be used in pistons having skirts of various thicknesses. The device illustrated, which is shown in the drawing approximately three times its actual size, may be used in pistons having skirts as thin as $\frac{1}{16}''$ or as thick as $\frac{3}{16}''$. By counter-boring the end 8 of the nut N as shown at 10 the tapered head 5 of the screw S may extend into the end of the nut (see Fig. 3) thus permitting the desired degree of expansion to be obtained even with very thin wall piston skirts. As noted before the hole 9 in the washer W is made large enough to permit the tapered head 5 of the screw S to extend down into the counter-bore portion 10 of the nut N.

By providing a circular counter-bored portion in the walls of the skirt adjacent the slot and providing a round tapered end of the screw S a fulcrum is provided about which the skirt 1 of the piston may move to accommodate irregularities in the cylinder diameter and take care of the normal expansion of the piston in operation. Moreover, a large number of present day pistons are cam ground and the slight added rigidity which may be caused by my expander is not detrimental to successful operation because the cam ground shape will permit expansion to occur. I have found that in actual use of my expander a piston skirt may be expanded several thousandths of an inch after it has been expanded to a point where it snugly fits the cylinder wall, thus indicating that the skirt is still sufficiently resilient to meet all operating conditions. By counter-boring the skirt slightly above the center of the slot 2 the lower portion of the skirt is permitted to retain a degree of resiliency and to move about the screw S as a pivot or fulcrum. A free pivoting action may take place due to the fact that the engaging tapered surfaces of the skirt and expander are circular thus offering a minimum of resistance to movement. If for any reason it is desired to increase the flexibility of the bottom portion of the skirt 1 the expander may be positioned closer to the top of the slot 2 than is illustrated in Figure 1 of the drawing. Likewise, if it is desired to make the lower portion of the skirt 1 more rigid the expander may be dropped down closer to the bottom of the slot, the exact position of the expander being determined by the particular conditions under which the piston is to operate.

In the preferred form of my device the threaded portion 6 of the screw S is made with sixty-four threads per inch and the nut is provided with six sides. With this arrangement, and a sixty degree taper on the head 5 of the screw S and in the counter-bore 4 of the piston skirt, turning the nut N one-sixth turn on the screw S will cause the piston skirt to expand approximately .001'' in diameter. Thus, a very fine and accurate adjustment of the size of the piston skirt may be obtained and installation and fit of the pistons to the cylinder is greatly facilitated. The installation and adjustment of the device is further assisted by the arrangement of the lugs 12 on the screw S and the lugs 16 and 17 on the washer W which prevent undesirable rotation of these parts during installation and operation.

Although I have described the illustrated embodiment of my improved piston expander in considerable detail it will be understood by those skilled in the art that modifications and variations may be made without departing from the spirit of my invention. I do not, therefore, wish to be limited to the particular form and proportions of the device illustrated herein, but claim as my invention all embodiments thereof coming within the scope of the appended claims.

I claim:

1. In combination with a piston having a slotted skirt, said skirt having a tapered counter-bore portion at the slot in the skirt, a tapered member adapted to fit in the tapered counter-bored portion of the piston skirt, and means disposed within said skirt for drawing said tapered member radially inwardly into said counter-bored portion of the skirt, said tapered member having its end surface spaced radially inwardly from the outer surface of the piston skirt.

2. In combination with a piston having a slotted skirt, said skirt having a tapered counter-bored portion at the slot in the skirt, a tapered member adapted to fit in the tapered counter-bored portion of the piston skirt, means disposed within said skirt for drawing said tapered member radially inwardly into said counter-bored portion of the skirt, and means for locking in position said means for drawing said tapered member into said counter-bored portion.

3. In combination with a piston having a slotted skirt, said skirt having a tapered counter-bored portion extending into said slot with the large end of the taper toward the outer surface of the skirt, a tapered member adapted to fit in the tapered counter-bored portion of the piston skirt, and means disposed within said skirt for drawing said tapered member into said counter-bored portion of the skirt, said counter-bored portion and said tapered member being smooth and substantially circular in cross-section whereby said skirt may have pivoted movement about said tapered member.

4. In a piston expander, the combination of a screw having a tapered head portion, a washer having an aperture through which said screw may extend, and a nut adapted to have threaded engagement with said screw and having one end adapted to seat against said washer, said end of said nut being counter-bored and said washer having a flared portion adapted to engage said counter-bore in said nut whereby said screw is maintained centered in said aperture in said washer.

5. In combination with a piston having a slotted skirt and a tapered counter-bore at the slot in the skirt, said counter-bore having its large diameter toward the outside of said skirt, a screw having a tapered head adapted to fit within the tapered counter-bore of the piston skirt, and threaded means adapted to engage said screw on the inside of said piston skirt and to draw said tapered head of said screw into said counter-bore to expand said piston skirt, the end of said tapered head being spaced radially inwardly from the outer surface of said piston skirt.

6. In combination with a piston having a slotted skirt and a tapered counter-bore at the slot in the skirt, a screw having a tapered head adapted to fit within the tapered counter-bore of the piston skirt, said screw head having a lug formed thereon and adapted to engage the piston skirt at the slot and prevent rotation of said screw and screw head in the piston skirt and threaded means adapted to engage said screw on the inside of said piston skirt and to draw said tapered head of said screw into said counter-bore, the tapered head of the screw co-acting with the sides of the counter-bore in the skirt for expanding the latter.

7. In combination with a piston having a slotted skirt and a tapered counter-bore at the slot in the skirt, a screw having a tapered head disposed in said tapered counter-bore, said screw extending inwardly through the wall of said skirt and said screw head having a lug formed thereon and adapted to engage the piston skirt at the slot and prevent rotation of said screw and screw head in the piston skirt, a threaded member adapted to engage said screw on the inside of said skirt and a washer disposed on said screw between said threaded member and said skirt.

8. In combination with a piston having a slotted skirt and a tapered counter-bore at the slot in the skirt, a screw having a tapered head disposed in said tapered counter-bore, said screw extending inwardly through the wall of said skirt and said screw head having a lug formed thereon and adapted to engage the piston skirt at the slot and prevent rotation of said screw and screw head in the piston skirt, a threaded member adapted to engage said screw on the inside of said skirt and a washer member disposed on said screw between said threaded member and said skirt, said washer having a resilient locking portion engaging said threaded member and adapted to retain said screw and threaded member in adjusted relation.

9. In combination with a piston having a slotted skirt and a tapered counter-bore at the slot in the skirt, a screw having a tapered head disposed in said tapered counter-bore, said screw extending inwardly through the wall of said skirt and said screw head having a lug formed thereon and adapted to engage the piston skirt at the slot and prevent rotation of said screw and screw head in the piston skirt, a threaded member adapted to engage said screw on the inside of said skirt and a washer member disposed on said screw between said threaded member and said skirt, said washer having a lug extending into the slot to prevent rotary movement of said washer on the piston skirt.

10. In combination with a piston having a slotted skirt and a tapered counter-bore at the slot in the skirt, a screw having a tapered head disposed in said tapered counter-bore, said screw extending inwardly through the wall of said skirt and said screw head having a lug formed thereon and adapted to engage the piston skirt at the slot and prevent rotation of said screw and screw head in the piston skirt, a threaded member adapted to engage said screw on the inside of said skirt and a washer member disposed on said screw between said threaded member and said skirt, said washer having a resilient locking member engaging said threaded member and adapted to retain said screw and threaded member in adjusted relation and having a lug extending into the slot to prevent rotary movement of said washer on the piston skirt.

11. In combination with a piston having a slotted skirt and a tapered counter-bore at the slot in the skirt, a screw having a tapered head disposed in said tapered counter-bore, said screw extending inwardly through the wall of said skirt and said screw head having a lug formed thereon and adapted to engage the piston skirt at the slot and prevent rotation of said screw and screw head in the piston skirt, a threaded member adapted to engage said screw on the inside of said skirt and a washer member disposed on said screw between said threaded member and said skirt, one end of said threaded member being counter-bored and said washer having a flared portion adapted to engage the counter-bore in said threaded member.

12. A piston expander including a screw having a tapered head, said head having a lug extending outwardly from its surface, a nut adapted to engage said screw and having a tapered counter-bore at one end, and a washer having an aperture adapted to fit over said screw, said washer having a flared portion adjacent said aperture, said flared portion being adapted to enter said counter-bored end of said nut.

13. A piston expander including a screw having a tapered head, said head having a lug extending outwardly from its surface, a nut adapted to engage said screw and having a tapered counter-bore at one end, and a washer having an aperture adapted to fit over said screw, said washer having a flared portion adjacent said aperture, said flared portion being adapted to enter said counter-bored end of said nut, and said washer having oppositely disposed resilient locking members adapted to engage opposite flat sides of said nut.

14. A piston expander including a screw having a tapered head, said head having a lug extending outwardly from its surface, a nut adapted to engage said screw and having a tapered counter-bore at one end, and a washer having an aperture adapted to fit over said screw, said washer having a flared portion adjacent said aperture, said flared portion being adapted to enter said counter-bored end of said nut, and said washer having oppositely disposed resilient locking members adapted to engage opposite flat sides of said nut and having a lug extending in the opposite direction from said flared portion of the washer.

15. A piston expander comprising a tapered member adapted to engage a correspondingly tapered radially extending aperture at a slot in a piston skirt, said tapered member having a member associated therewith and adapted to extend through the piston skirt to the inside thereof, and means disposed on the inside of the piston skirt adapted to co-act with said member which extends through the piston skirt to draw said tapered member into the tapered aperture in the piston skirt and means for preventing rotation of said tapered member in said aperture in said skirt.

16. A piston having its skirt formed with a vertically disposed slot and a countersunk opening at said slot, a screw having a countersunk head disposed in the opening, a nut threaded on the inner end of the screw for drawing the same inwardly, the countersunk head of the screw coacting with the sides of the countersunk opening in the skirt for expanding the latter, a laterally extending ear formed on the head of the screw disposed in said slot to prevent turning of the screw, and locking means for said nut.

DEAN M. SOLENBERGER.